US011615406B2

(12) United States Patent
Wang et al.

(10) Patent No.: US 11,615,406 B2
(45) Date of Patent: Mar. 28, 2023

(54) METHOD AND SYSTEM FOR PROVIDING A SERVICE AT A SELF-SERVICE MACHINE

(71) Applicant: MASTERCARD ASIA/PACIFIC PTE. LTD., Singapore (SG)

(72) Inventors: Zunhua Wang, Singapore (SG); Srinatha Ravinathan, Singapore (SG); Donghao Huang, Singapore (SG); Shiying Lian, Singapore (SG)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 141 days.

(21) Appl. No.: 17/087,229

(22) Filed: Nov. 2, 2020

(65) Prior Publication Data

US 2021/0133740 A1 May 6, 2021

(30) Foreign Application Priority Data

Nov. 5, 2019 (SG) .......................... 10201910299R

(51) Int. Cl.
  *G06Q 20/38* (2012.01)
  *G06Q 20/32* (2012.01)
  *G06Q 20/18* (2012.01)
(52) U.S. Cl.
  CPC ....... *G06Q 20/38215* (2013.01); *G06Q 20/18* (2013.01); *G06Q 20/3223* (2013.01); *G06Q 20/3278* (2013.01)
(58) Field of Classification Search
  None
  See application file for complete search history.

(56) References Cited

U.S. PATENT DOCUMENTS

| | | | |
|---|---|---|---|
| 9,491,273 B2* | 11/2016 | Levionnais | ....... H04M 1/72409 |
| 10,475,296 B1* | 11/2019 | Soprano-Joseph | ...... G07G 1/12 |
| 11,144,901 B1* | 10/2021 | Dennis | ................. G06Q 20/227 |
| 2013/0072255 A1* | 3/2013 | Levionnais | .......... G06K 19/077 |
| | | | 455/552.1 |
| 2018/0262891 A1* | 9/2018 | Wu | ..................... H04W 12/065 |

OTHER PUBLICATIONS

"Card Payments Roadmap in the United States: How will EMV Impact the Future Payments infrastructure, PC-12001, Jan. 2013, 8, 13" (Year: 2013).*
"Visa Smart Debit/Credit and Visa payWave, Nov. 2016, U.S. Acquirer Implementation Guide version 2.2, 15-18" (Year: 2016).*

* cited by examiner

*Primary Examiner* — Kito R Robinson
*Assistant Examiner* — Toan Duc Bui
(74) *Attorney, Agent, or Firm* — Jordan IP Law, LLC

(57) ABSTRACT

A system for providing a service at a self-service machine having a device identifier and that does not have internet connectivity or that is in an off-line state includes: a validation server that stores the device identifier, the validation server being in communication with a mobile device of a user, but not with the self-service machine. The self-service machine is configured to: receive a selection of a service; generate a service request identifier for the selected service; add the service request identifier to a list of service requests to be fulfilled; and communicate, to the mobile device by a first direct communication method, service request data including the service request identifier, a terminal identifier of the self-service machine, and an address of a validation server.

19 Claims, 7 Drawing Sheets

METHOD AND SYSTEM FOR PROVIDING A SERVICE AT A SELF-SERVICE MACHINE

CROSS-REFERENCE TO RELATED APPLICATIONS

The present application claims priority to Singapore Patent Application No. 10201910299R (filed on Nov. 5, 2019), which is hereby incorporated by reference in its entirety.

TECHNICAL FIELD

The present disclosure relates to a method and system for providing a service at a self-service machine.

BACKGROUND

Payment cards such as credit cards and debit cards are very widely used for all forms of financial transaction. The use of payment cards has evolved significantly with technological developments over recent years. Payment cards typically have a magnetic stripe readable by a magnetic stripe reader on a point of sale (POS) terminal to perform a transaction, and now generally also contain an integrated circuit that communicates with a smart card reader in the POS terminal. Using this approach, a transaction is typically confirmed by a personal identification number (PIN) entered by the card user. Cards of this type typically operate under the EMV standard for interoperation of chip cards and associated apparatus (such as POS terminals and ATMs). ISO/IEC 7816 provides a standard for operation of cards of this type.

Technology has further developed to provide payment cards which operate contactlessly—under EMV, these are covered under the ISO/IEC 14443 standard. Using such cards, the account number can be read automatically from the card by a POS terminal, generally using a short range wireless technology such as Radio Frequency Identification (RFID)—this approach is generally referred to as "contactless" or "proximity" payment. This is typically enabled by embedding of an RFID tag in a card body together with a suitable antenna to allow transmission and receipt of wireless signals—the transmissions may be powered by a radio frequency interrogation signal emitted by a proximity reader in the POS terminal.

A recent development is the use of a computing device such as a mobile telephone as a proxy for a payment card. A payment application installed on a mobile cellular telephone handset (hereafter "mobile phone") enables the mobile phone to act as a proxy for a payment card using Near Field Communication (NFC) technology standards, which are built in to the majority of current mobile phones. NFC is a development upon RFID, and NFC-enabled devices are able to operate in the same manner as RFID devices—though an NFC-device is active rather than passive, as it is powered by the mobile phone battery rather than relying on inductive pickup from a reader device. Using such payment applications, a user can conduct tapping based transactions with a proximity reader, as well as perform account management operations over an appropriate network interface (cellular, local wireless network) in an online banking interface with the user's account provider.

A variety of digital payment systems are now available or under development, often involving a combination of a payment application directed to the making of a payment card transaction with a digital wallet to hold personal information.

One area of difficulty for effective application of payment card systems is for self-service machines such as vending machines and other unattended retail devices. Vending machine transactions are generally of relatively low value and while many vending machines are connected to a communications infrastructure, many are not. Many vending machines are provided with a payment card interface and typically an associated communications interface to obtain authorisation for a payment card transaction, but this model is unsatisfactory both for vendors (as it drives up the cost of the vending machine) and for users (as the user experience is typically relatively poor).

It would be desirable to address one of more of the above difficulties, or at least to provide a useful alternative.

SUMMARY OF THE PRESENT DISCLOSURE

Disclosed herein is a method for providing a service at a self-service machine that does not have internet connectivity or that is in an off-line state, the method including:

receiving, at the self-service machine, a selection of a service;

generating a service request identifier for the selected service;

adding the service request identifier to a list of service requests to be fulfilled;

communicating, to a mobile device by a first direct communication method, service request data including the service request identifier, a terminal identifier of the self-service machine, and an address of a validation server;

receiving, from the validation server via the mobile device, by a second direct communication method, receipt data indicating confirmation of completion of an electronic payment transaction initiated by the mobile device and associated with the service identifier; and responsive to validating the receipt data, starting the selected service at the self-service machine, and removing the service request identifier from the list.

The method may include the validation server forwarding a payment transaction request from the mobile device to an acquirer system for approval; and receiving, from the acquirer system, the receipt data.

In some embodiments, the method includes the validation server forwarding a transaction identifier of the electronic payment transaction to a payment network for verification; and receiving, from the payment network, the receipt data.

The first direct communication method may be the same as the second direct communication method. For example, the first direct communication method and/or the second direct communication method may be near-field communication (NFC).

In certain embodiments, the service request data includes a hash-based message authentication code (HMAC).

In certain embodiments, the service request data is generated by a smart card emulator of the self-service machine.

In certain embodiments, the smart card emulator includes an EMV kernel, and wherein the service request data includes an EMV authorisation request cryptogram (ARQC).

The receipt data may include an EMV transaction certificate (TC), and the smart card emulator may be configured to validate the TC.

Also disclosed herein is one or more non-transitory computer-readable storage media having stored thereon machine-readable instructions for causing at least one processor to perform a method as disclosed herein.

Also disclosed herein is a self-service machine including:
at least one processor in communication with computer-readable storage having instructions stored thereon for causing the self-service machine to:
receive a selection of a service;
generate a service request identifier for the selected service;
add the service request identifier to a list of service requests to be fulfilled;
communicate, to a mobile device by a first direct communication method, service request data including the service request identifier, a terminal identifier of the self-service machine, and an address of a validation server;
receive, from the validation server via the mobile device, by a second direct communication method, receipt data indicating confirmation of completion of an electronic payment transaction initiated by the mobile device and associated with the service identifier; and
responsive to validating the receipt data, start the selected service, and removing the service request identifier from the list.

The self-service machine may include a smart card emulator that is configured to generate the service request data. The smart card emulator may include an EMV kernel, and the service request data may include an EMV authorisation request cryptogram (ARQC).

In certain embodiments, the receipt data includes an EMV transaction certificate (TC), and the smart card emulator is configured to validate the TC.

Also disclosed herein is a system for providing a service at a self-service machine that does not have internet connectivity or that is in an off-line state, the system including:
the self-service machine having a device identifier;
a validation server that stores the device identifier, the validation server being in communication with a mobile device of a user, but not with the self-service machine;
wherein the self-service machine is configured to:
receive a selection of a service;
generate a service request identifier for the selected service;
add the service request identifier to a list of service requests to be fulfilled;
communicate, to the mobile device by a first direct communication method, service request data including the service request identifier, a terminal identifier of the self-service machine, and an address of a validation server;
wherein the validation server is configured to:
receive, from the mobile device, the service request data;
receive, from an issuer system, a payment network, or an acquirer system, receipt data indicative of completion of a payment transaction request for the service request by the mobile device; and
transmit, to the mobile device, the receipt data;
wherein the self-service machine is further configured to:
receive, from the mobile device, by a second direct communication method, the receipt data; and
responsive to validating the receipt data:
start the selected service, and
remove the service request identifier from the list.

The validation server may be configured to forward the payment transaction request from the mobile device to the acquirer system for approval.

In certain embodiments, the validation server is configured to forward a transaction identifier of the payment transaction request to the payment network for verification; and receive, from the payment network, the receipt data.

The first direct communication method and/or the second direct communication method may be near-field communication (NFC).

In certain embodiments, the self-service machine includes a smart card emulator that is configured to generate the service request data. The smart card emulator may include an EMV kernel, and the service request data may include an EMV authorisation request cryptogram (ARQC).

In certain embodiments, the receipt data includes an EMV transaction certificate (TC), and the smart card emulator is configured to validate the TC.

BRIEF DESCRIPTION OF THE DRAWINGS

Embodiments of the present invention will now be described, by way of non-limiting example, with reference to the drawings in which.

DETAILED DESCRIPTION

Embodiments of the invention generally relate to methods and systems of providing a service at a self-service machine that requires verification that a required action in a networked environment has occurred prior to providing the service, but which cannot connect to the networked environment to perform the verification. For example, the self-service machine may be a vending machine or other unattended retail device, and the required action may be an electronic payment for the service. In this example, the vending machine cannot go online to perform the electronic payment, so requires some other way to verify that payment has occurred. The following discussion will describe several embodiments of methods for doing so. It will be understood that while embodiments are described in relation to vending machines, there are many other contexts in which embodiments of the invention are applicable.

Figure 1:
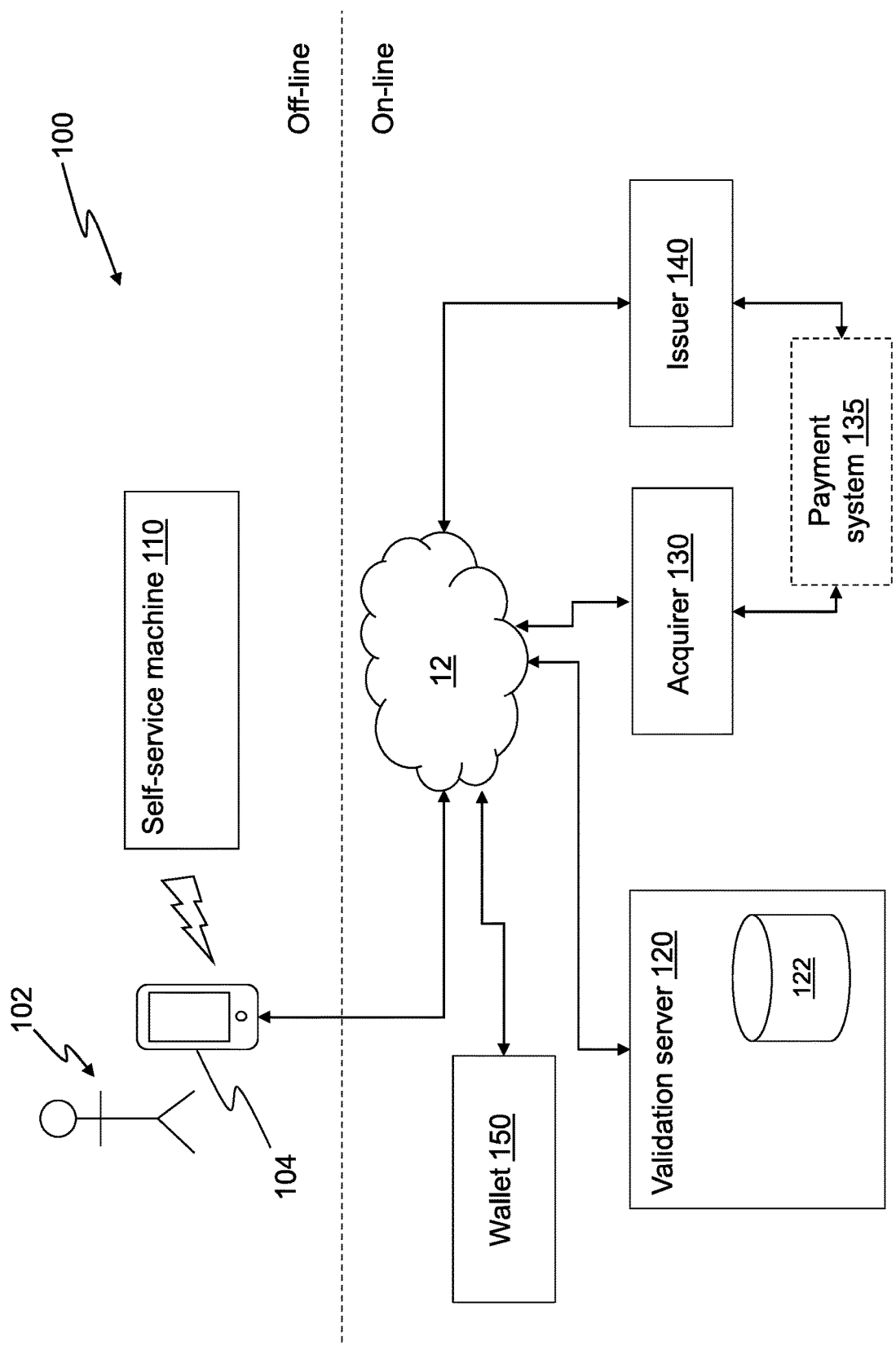
FIG. 1 is an example system architecture of a system for providing a service at a self-service machine.

In FIG. 1, a system 100 for providing a service includes a self-service machine 110, such as a vending machine. Only one self-service machine 110 is shown, but in practice, the system 100 may include many such machines.

The self-service machine 110 either does not have internet connectivity, in that it has no network interface capable of connecting self-service machine 110 to the internet 12, or is in an off-line state, i.e. it does have a network interface that is so capable, but the network interface is disconnected or inoperable. Accordingly, self-service machine 110 cannot go online to perform operations such as electronic payments.

System 100 also includes a validation server 120 that is operated by the same entity as self-service machine(s) 110.

The validation server 120 may be a server of an unattended retail service, for example. The validation server 120 includes a data store 122 that stores records of self-service machines 110. In particular, the data store 122 may store device identifiers for respective self-service machines 110 that are registered with the validation server 120.

The data store 122, or another part of the validation server 120, may also store cryptographic keys for validating transactions made at self-service machines 110. For example, when a self-service machine 110 is onboarded with and consequently registered with the validation server 120, the self-service machine 110 may generate an asymmetric key pair comprising a private key and a public key. The private key may be securely stored at the self-service machine 110 and the public key may be transmitted to the validation server 120 and stored in association with the device identifier of the self-service machine 110. Accordingly, data that is cryptographically signed by the self-service machine 110 using its private key may be validated by the validation server 120 using the corresponding public key of the asymmetric key pair (which is retrieved by validation server 120, for example from data store 122, using the device identifier of the self-service machine 110).

As will later be described in further detail, the self-service machine 110 is configured to receive a selection of a service by a user 102, such as vending of a product stored in the machine, and to communicate with a mobile device 104 of the user 102 over one or more direct communication channels to arrange for completion of a payment transaction for the service.

A direct communication channel, as used herein in reference to two computing devices communicating with each other, is one which does not require either of the computing devices to have internet connectivity. Examples of direct communication channels are those established via wireless protocols such as NFC or Bluetooth. Another example of a direct communication channel is that established via the presentation of a machine-readable code, such as a QR code, on one device, and the reading and interpretation of that code by the other device (e.g., via an optical method such as by scanning with a camera).

Advantageously, by communicating with the mobile device 104 over direct communication channels, it is possible for the self-service machine 110 to perform certain tasks that would otherwise require connectivity, by making use of the connectivity of the mobile device. In particular, the self-service machine 110 does not need to itself implement any electronic payment functionality, as this can be delegated to the mobile device 104 in conjunction with one or more other networked computer devices, such as validation server 120, acquirer 130 and issuer 140.

The mobile device 104 and the validation server 120 are in communication with each other and with various other systems via a wide-area network, such as the Internet 12. For example, mobile device 104 may communicate with a wallet server 150 to carry out payment transactions via a digital wallet of the user 102, and/or with issuer 140 to carry out payment transactions via one or more other payment instruments (such as credit cards or debit cards) of the user 102.

Validation server 120 may communicate with acquirer system 130 and/or issuer system 140 to initiate payment transactions requested by user 102, and/or receive and forward confirmation of payment transactions that are carried out by acquirer system 130 and issuer system 140, optionally in conjunction with payment system 135. As is known in the art, the acquirer system 130 (typically that of a financial institution) operates an account on behalf of a merchant, such as the operator of validation server 120. The issuer system 140 operates an account on behalf of the user 102. Accordingly, acquirer system 130 and issuer system 140 cooperate to transfer funds between the account of the user 102 and the account of the merchant 120, optionally with the involvement of the payment system 135 (e.g., acting as a switch and/or clearance and settlement service).

Figure 2:
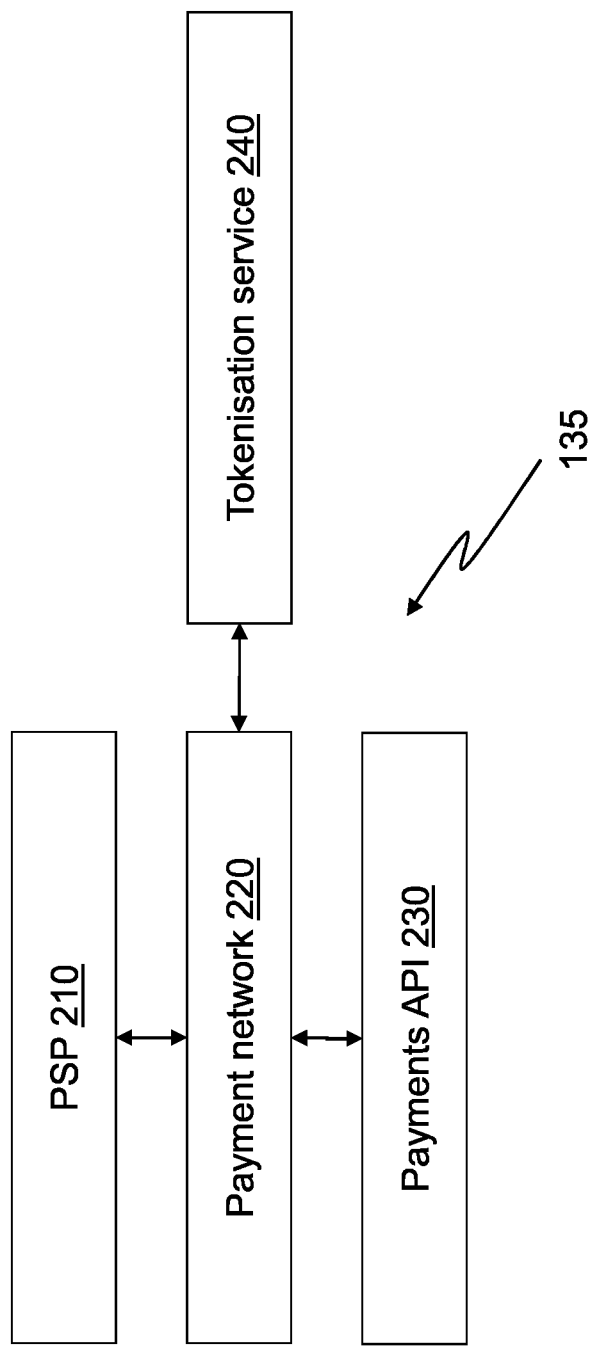
FIG. 2 is an example system architecture of a payment system of FIG. 1.

An exemplary payment system 135 is shown in FIG. 2, and includes a payment network 220 such as Mastercard. Third parties such as acquirers 130 and issuers 140 may have dedicated connections (called network interface processors or NIPs) to the payment network 220 for processing of payment transactions.

In some embodiments, the payment network 220 optionally communicates with a payment service provider 210 that provides an interface for a merchant, issuer 140 or acquirer 130, that may not have a NIP, to connect to the payment network 220 to request a payment transaction. The payment network 220 may also provide an interface in the form of a payments API 230 that also enables third parties without a NIP to access functionality of the payment network 220, such as payment transaction processing, via API calls. One such payment API is the Mastercard Send API, that enables remittance of funds between various types of payment instrument, such as bank accounts, payment cards, and digital wallets.

Acquirer 130 may maintain an account that is associated with the validation server 120, and/or accounts that are associated with merchants that are registered with the validation server 120. For example, acquirer 130 may issue an acquiring PAN to validation server 120, such that validation server 120 can receive payments, for example via a push payment mechanism as described below. In another example, one or more acquirers 130 may issue acquiring PANs or other types of accounts to merchants. Each merchant may provide its acquiring PAN or other account to validation server 120 when registering with the validation server 120. Each merchant may operate one or more of the self-service machines 110. Accordingly, payment may be made to a merchant's account through payment system 135 in concert with acquirer(s) 130, either directly or through an account of validation server 120.

The payment system 135 may also include a tokenisation service 240 that communicates with payment network 220, and optionally also with issuer 140. The tokenisation service may store mappings between payment credentials issued by issuers 140, such as primary account numbers (PANs), and surrogate values called tokens. These mappings are stored securely in a token vault that is accessible only by trusted entities such as the payment network 220 and the operator of the tokenisation service 240. Typically, tokens have the same format as a PAN such that they can be used for generation of transaction messages in the usual manner for transmission across payments infrastructure (e.g. ISO 8583 or ISO 20022 messages). Tokens may be single-use or otherwise limited in number or duration of usage, and may also be restricted in other ways, such as not being allowed for use with certain merchant categories or payment channels (e.g. no online transactions allowed), to improve security. During a transaction, a message reaching payment network 220 and containing a token will be recognised as such, so that the payment network 220 may request detokenization (i.e. a lookup of the payment token in the token vault) to retrieve the actual PAN to be able to route the transaction request to the issuer.

Figure 3:
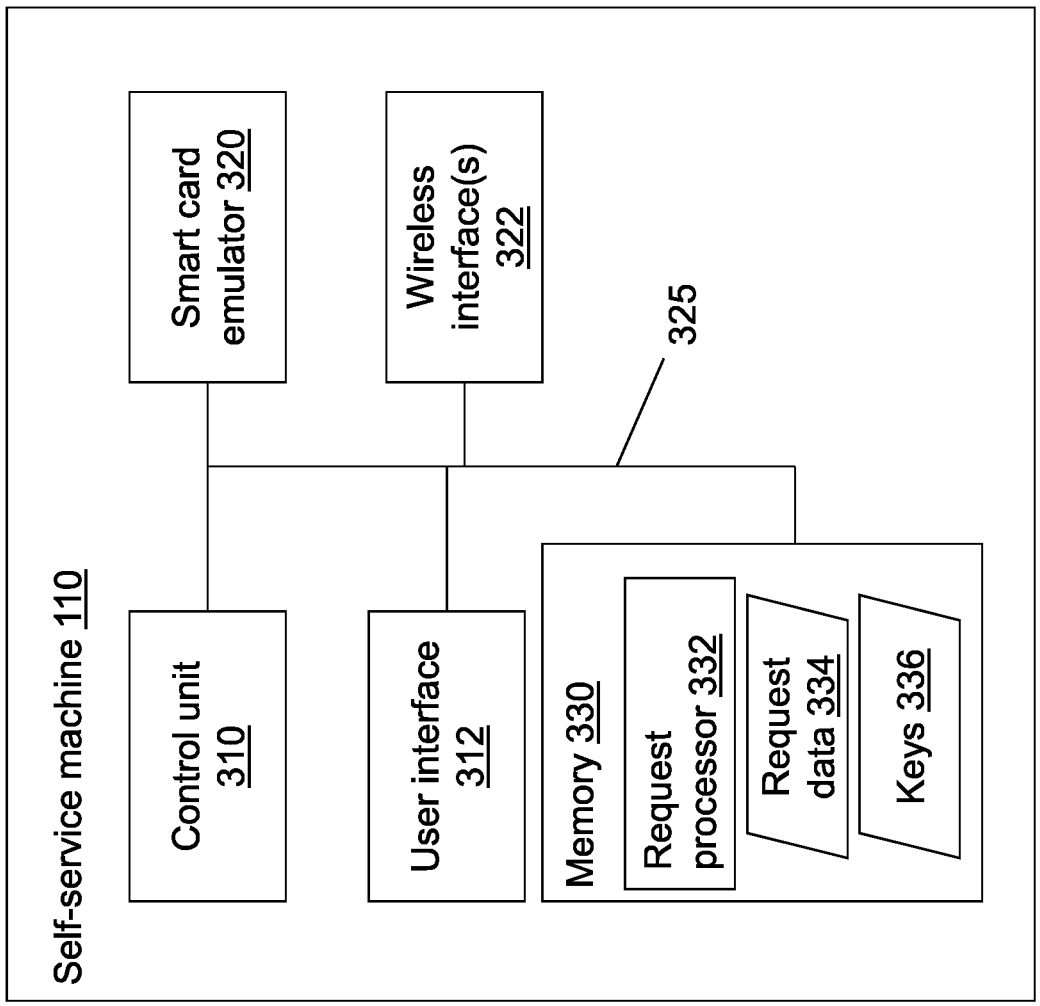
FIG. 3 is an example system architecture of a self-service machine of the system of FIG. 1.

Turning now to FIG. 3, an example of a self-service machine 110 comprises a conventional vending machine control unit 310. This control unit 310 controls vending and other functions of the vending machine, and is connected to the normal vending machine interface and conventional payment systems such as a coin acceptor and even a conventional card acceptor (both not shown). However, the control unit 310 can also accept instructions and communicate through a multidrop bus (MDB) interface 325—this is a standard component of a conventional vending machine. Connected to the multidrop bus 325 is a smart card emulator module 320. The smart card emulator module 320 includes an NFC interface, and enables self-service machine 110 to appear to external devices, such as near-field communication (NFC)-enabled devices including mobile phones, to be a smart card device such one that operates according to the EMV specification. Smart card emulator module 320 may conform to ISO/IEC 7816 and ISO/IEC 14443, as mentioned above.

Aside from the NFC interface of smart card emulator 320, self-service machine 110 may also include other wireless interfaces 322, such as a Bluetooth (e.g., BLE) interface.

Self-service machine 110 includes a user interface 312. The user interface may include a display that conveys information to the user 102 about available products, selections of products made by the user 102, and prompts to the user 102 to perform certain actions, such as launching a payment application on their mobile device 104 or tapping their mobile device 104 to complete confirmation of a transaction. The user interface 312 may also include input means for the user to input product selections (for example). The input means may be the display itself, for example, or a separate component such as a keypad.

Self-service machine 110 further includes a memory 330 that may store programs and data for controlling various operations of the self-service machine 110. For example, the memory 330 may store a request processor module 332 that receives requests made by users 102 via user interface 312, and cooperates with smart card emulator 320 and control unit 310 to fulfil service requests (such as requests to vend products from self-service machine 110) in a manner which will be described in further detail below.

Memory 330 may also store an asymmetric key pair 336 of the self-service machine 110. Key pair 336 may include a private key that is used to perform cryptographic operations such as signing of messages or other data, and a public key that is provided to validation server 120 and stored in association with a device identifier of self-service machine 110. This allows validation server 120 to confirm, using the stored public key, that signed messages that it receives that contain the device identifier, and thus purportedly originate from the self-service machine, are authentic.

The smart card emulator 320 does not need to emulate a payment card, since payment functionality is delegated to mobile device 104 in communication with the other networked devices 120, 130, 140 as noted above and as will be described in more detail below.

Together, the smart card emulator module 320 and request processor module 332 communicate with the mobile device 104 through one or more short range communication methods to enable payment for a transaction and to obtain proof that a transaction has been authorised and vending should be enabled. The smart card emulator module 320 and request processor module 332 also communicate with the control unit 310 to obtain transaction details and to instruct the control unit 310 to enable vending when authorised payment is received.

As shown in FIG. 1, the validation server 120 communicates with the mobile device 104, and not with the self-service machine 110. There is a direct connection between the mobile device 104 and the validation server 120—this may be, for example, by data communication over a cellular wireless telecommunications network. The validation server 120 is a computing apparatus (containing conventional elements such as a processor, memory and networking apparatus), but in embodiments must be secure and adapted for cryptographic operations, for example signing data with the private key of a card network or other party trusted by the vending machine owner, or validating a cryptographic signature that is purportedly received from a self-service machine 110 via some other party, such as user 102 using mobile device 104.

The validation server 120 may communicate with the payment system 135 in a conventional manner, similar for example to a mobile point of sale terminal, typically over the public internet 12. For example, the validation server 120 may interact with PSP 210, which then propagates transaction information on to the acquirer 130, card network 220 and card issuer 140 as necessary, and receives the results of a transaction authorisation process and feeds them back to the validation server 120.

In general terms, a vending machine transaction according to an embodiment of the disclosure may be carried out in the following way.

On a user 102 making a service selection at the self-service machine 110, a service request identifier may be generated. The service request identifier may be added to a list of service requests to be fulfilled (and, for example, may be stored as service request data 334 as shown in FIG. 3). The list represents a set of persistent service requests that continue to be stored by self-service machine 110 until the service request is fulfilled, or until the request times out (e.g., after some predetermined time).

The self-service machine 110 may communicate, to the mobile device 104 by a first direct communication method, service request data including the service request identifier, a terminal identifier of the self-service machine, and an address of the validation server 120. For example, the first direct communication method may be NFC and the user 102 may bring mobile device 104 into proximity with smart card emulator module 320 of the self-service machine 110 to cause an exchange of commands and data, including the service request data, between smart card emulator module 320 and mobile device 104.

The self-service machine 110 may also receive, from the mobile device 104 by a second direct communication method, receipt data indicating confirmation of completion of an electronic payment transaction initiated by the mobile device 104 and associated with the service identifier. For example, the second direct communication method may also be, but need not be, NFC. If the self-service machine 110 includes a smart card emulator 320, the receipt data may be, or may include, an EMV transaction certificate (TC).

Further, the self-service machine 110 may, responsive to validating the receipt data, start the selected service, and remove the service request identifier from the list. For example, if the selected service is vending of a product, the self-service machine 110 (via service engine 116, for example) may actuate vending components (not shown) to vend the product to the user 102.

The receipt data may be validated in various ways. For example, if the self-service machine 110 includes a smart card emulator 320, and the receipt data includes a TC, the smart card emulator 320 may perform cryptographic validation of the TC in known fashion according to the EMV specification.

Figure 4:
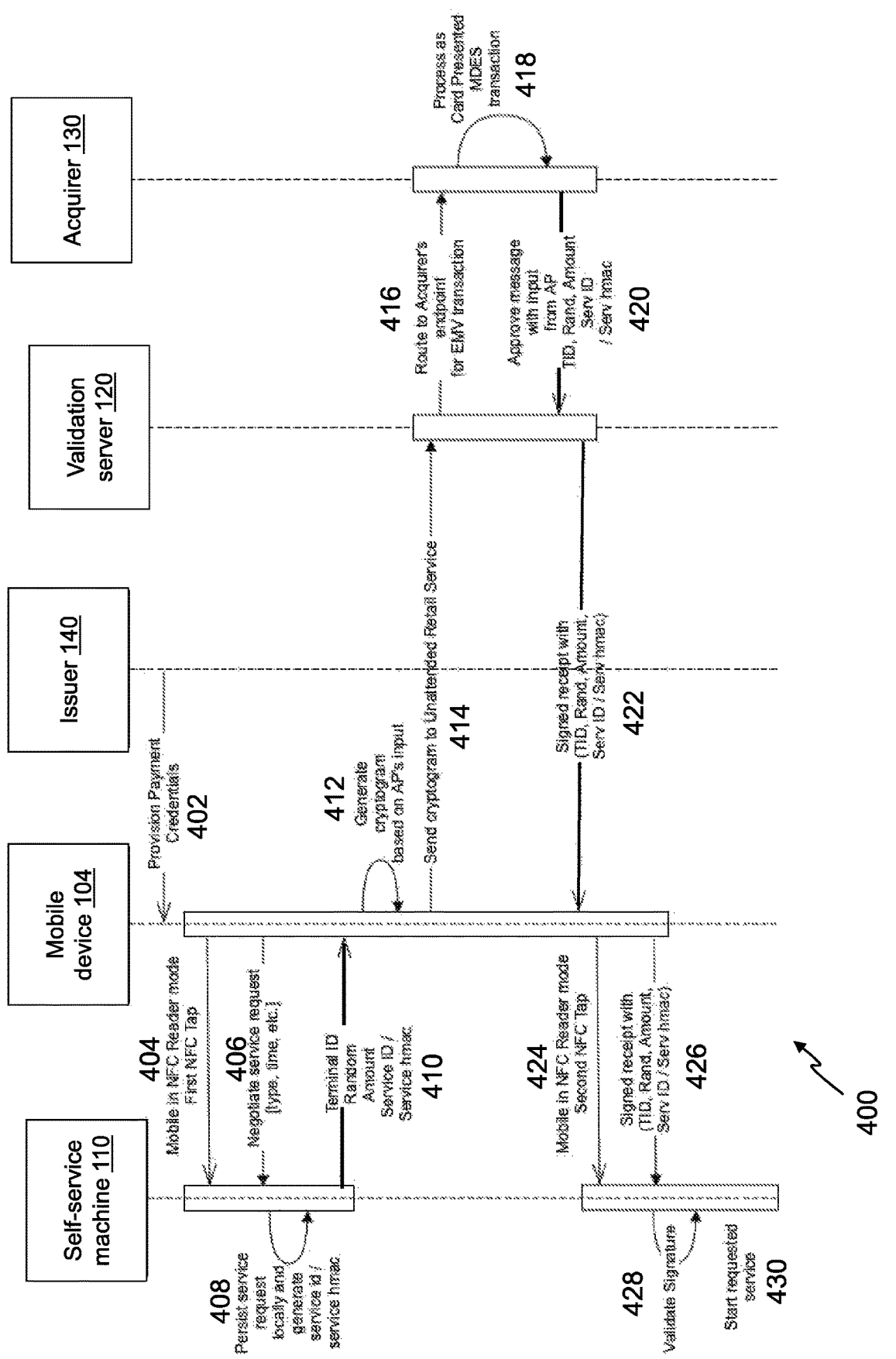
FIG. 4 is a messaging flow in a first embodiment of a method for providing a service at a self-service machine.

A first embodiment of a method 400 for providing a service at a self-service machine 110 will now be described with reference to FIG. 4.

In an initial step (not shown), the user 102 makes a selection of one or more products to be purchased and dispensed at the self-service machine 110.

Separately, at step 402, issuer 140 may provision payment credentials to the mobile device 140. This may occur prior to the user 102 making the selection, for example. The payment credentials may be in the form of a tokenised payment credential or payment token. The tokenised payment credential or payment token may be associated with a digital wallet application that executes on the mobile device 104. A digital wallet account having a wallet identifier may be maintained at wallet server 150 in this regard, and mobile device 104 may communicate with wallet server 150 in known fashion.

The payment token may be a single-use or limited-time token, and may have certain restrictions placed on it (such as a maximum transaction value or limit on the type of merchant with which the payment token may be used) to reduce the risk of fraud. In certain embodiments, issuer 140 may require that the payment token only be usable for payment to a specific merchant, such as a merchant that is associated with a particular self-service machine or set of self-service machines 110, or that is associated with validation server 120. In some embodiments, the user 102 of mobile device 104 may request such limitations through a mobile banking application or digital wallet application executing on the mobile device 104.

At step 404, the mobile device 104 may be placed in NFC reader mode so as to be able to receive data from an NFC-enabled device such as the smart card emulator 320 of self-service machine 110. The user 102 then taps mobile device 104 on self-service machine 110 in the proximity of the smart card emulator 320, the position of which may be indicated by visual indicia on the surface of self-service machine 110.

This initiates, at step 406, the exchange of a series of application protocol data units (APDUs) between smart card emulator 320 and mobile device 104. For example, mobile device 104 may transmit a "Select AID" command APDU to request application selection by smart card emulator 320. The application selection step causes smart card emulator 320 to initiate an application, for example request processor 332 stored in memory 330, for processing service requests at the self-service machine 110. Once successfully selected, the smart card emulator 320 may return an OK signal (e.g. success status word 90 00 H) to mobile device 104.

Next, still as part of step 406, the mobile device 104 transmits an "initialise transaction" command APDU to smart card emulator 320. The initialise transaction command may include service request data, including a service request type (e.g. "initiate vending request"), and information identifying the mobile device 104 and/or a wallet identifier of a wallet application installed on mobile device 104.

In response, at step 408, request processor 332 generates a service identifier for the requested service, and stores the service identifier as part of request data 334. The request data 334 may include other data related to the service request, such as the time of the request, and data relating to the payment credential used for the service request (e.g., the wallet identifier and/or the first 6 digits and/or the last 4 digits of the payment token).

The request processor 332 may generate a transaction request message that includes a terminal ID of the self-service machine 110, a random value (cryptographic nonce) which may be a transaction identifier or a value derived therefrom, a transaction amount (i.e., the total cost of the selected products), the service identifier.

The request processor 332 may also generate a hash-based message authentication code (HMAC) associated with the service identifier. The HMAC may be used to check integrity of the transaction request message, as well as authenticating the transaction request message. In one example, a HMAC may be generated based on the entire transaction request message. In certain embodiments, the HMAC may be generated using industry standard hash algorithms such as SHA-256 or SHA-3.

At step 410, the smart card emulator 320 transmits, to the mobile device 104, the transaction request message The smart card emulator 320 may also transmit, to the mobile device 104, a checkout URL for the mobile device 104 to checkout and thus complete payment. In certain embodiments, the checkout URL is a website of an acquirer 130 or a PSP 210. In other embodiments, the checkout URL may be a website of a secure remote commerce (SRC) initiator (not shown), and the URL may be launched by a browser of mobile device 104 to initiate a payment.

At step 412, the mobile device 104 parses the transaction request message, and generates an EMV cryptogram, such as an authorisation request cryptogram (ARQC), from the components thereof.

At step 414, mobile device 104 transmits a message including the payment token and the ARQC to validation server 120.

At step 416, validation server 120 receives the payment token and ARQC and transmits, to an acquirer system 130, an authorisation request message including the payment token and the ARQC. The authorisation request message may also include a wallet identifier, for example.

At step 418, the acquirer system 130 receives the authorisation request message, and routes it to the issuer 140 of the payment token, via payment system 135. To this end, payment system 135 may request, via tokenisation service 240, detokenization such that the PAN can be recovered and the correct issuer 140 thereby identified for routing purposes, as discussed above.

If the authorisation request is approved by issuer 140, issuer 140 returns a transaction certificate (TC) to acquirer 130 via payment system 135, and the acquirer system 130 forwards this to the validation server 120 at step 420. The TC is a signed digital receipt that indicates that the transaction has been approved, and that also includes the information provided by smart card emulator 320 in the original request, namely the terminal ID, nonce, transaction amount, service identifier and (if generated) the service HMAC.

At step 422, the TC is transmitted to the mobile device 104 by the validation server 120. At this point, the mobile device 104 may display an indication that the transaction has been successful, to prompt user 102 to complete the transaction at self-service machine 110.

At step 424, the mobile device 104 is again in NFC reader mode, and the user 102 taps the mobile device 104 for a second time in the proximity of the smart card emulator 320. This initiates a process in which mobile device 104 again sends a Select AID command APDU. Smart card emulator 320 receives the command, initiates the selected application substantially as above, and returns a 0x9000 (no error) response APDU to mobile device 104.

At step 426, mobile device 104 transmits the TC to smart card emulator 320.

At step 428, the smart card emulator 320 validates the TC, and if valid, at step 430, communicates with request processor 332 to start the selected service. For example, if the selected service is vending of one or more products, request processor 332 may instruct control unit 310 to dispense the one or more products.

As part of step 430, the request processor 332 may remove the service identifier from the list of requests in service request data 334.

The data communication steps between the self-service machine 110 and mobile device 104 are conveniently carried out via NFC. However, it is possible for these steps to occur via other channels. For example, the first data exchange at steps 404, 406 and 410 may instead occur via Bluetooth, ultrasound, or another wireless communication method, while the second data exchange at steps 424 and 426 occurs via NFC. In another example, the first data exchange may occur via NFC while the second data exchange occurs via Bluetooth, ultrasound, or another wireless communication method. In yet another example, both data exchanges may occur via Bluetooth, for example via a persistent Bluetooth connection.

In a further example, the first data exchange may be initiated via scanning of a machine-readable code by the mobile device 104. For example, after selection of the desired services is confirmed, the self-service machine 110 may display a QR code or other optical code that encodes the terminal ID, nonce, transaction amount, service identifier and service HMAC, and step 410 may include the mobile device 104 scanning the QR code to retrieve the required information for generating the ARQC at step 412. The second data exchange may then occur via NFC as described above, or via some other channel, such as Bluetooth or ultrasound transmission.

Figure 5:
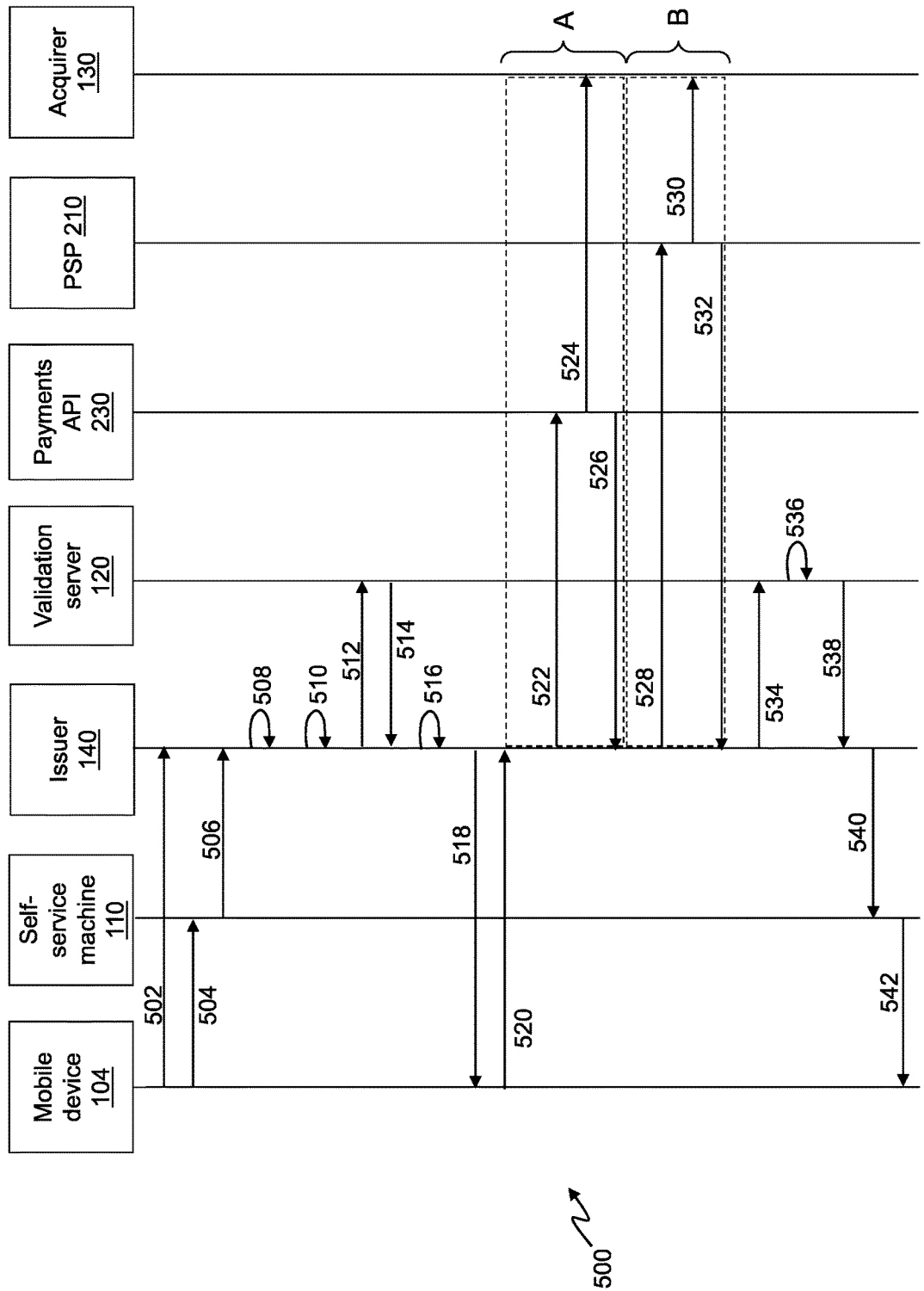
FIG. 5 is a messaging flow in a second embodiment of a method for providing a service at a self-service machine.

Turning now to FIG. 5, an alternative embodiment of a method 500 for providing a service at a self-service machine will be described. The embodiment of FIG. 5 makes use of push payments (rather than pull payments as in FIG. 4).

In an initial step (as before, not shown), the user 102 makes a selection of one or more products to be purchased and dispensed at the self-service machine 110.

At step 502, user 102 launches a payment application on mobile device 104. The payment application may be a mobile banking application or a wallet application operated by issuer 140 of the user 102's payment instrument, for example.

At step 504, user 102 taps mobile device 104 at self-service machine 110, as before. This may cause, at step 506, a first exchange of data, which may be substantially the same as at steps 406, 408 and 410 of the process 400. This causes a checkout URL of the validation server 120 to be transmitted to the payment application executing on mobile device 104, as well as transaction-related information as mentioned above.

At step 508, the payment application presents a payment initiation screen to user 102.

On confirmation that the user 102 wishes to initiate a payment, the payment application may, at step 510, parse the checkout URL and retrieve the terminal ID, nonce, transaction amount, and service identifier and if present, the service HMAC, from the transaction-related information.

At step 512, the issuer 140 may send a request to validation server 120 to retrieve supported currency types and one or more acquiring PANs, which are returned as a list at step 514.

The one or more acquiring PANs are used to identify one or more corresponding destination accounts to which funds may be remitted from the user's 102 account which is maintained by issuer 140. For example, each acquiring PAN may be associated with a single self-service machine 110, a group of self-service machines 110 that are associated with a specific merchant, or with the validation server 120 generally. In one embodiment, a single acquiring PAN may be associated with a pooled account of the validation server 120, and payments from users 102 may all be pushed to the pooled account from respective issuers 140. Each transaction made at a self-service machine 110 may be associated with a specific merchant (for example, on the basis of the device identifier of the self-service machine 110). The validation server 120 may later (for example, on a per-transaction basis or batch basis) remit funds to the specific merchants from the pooled account.

At step 516, if it is determined that the currency of the transaction is not supported, the issuer 140 may determine an exchange rate to be used for the transaction.

At step 518, the payment application presents a transaction screen on mobile device 104, in response to which the user 102 may select an account to be used (such as a payment card account or bank account) for the transaction, and confirm the amount of the transaction, at step 520.

The payment application may initiate a push payment in a number of different ways. In one type of push payment, indicated in dotted outline at box A of FIG. 5, the payment application creates a transaction request message at step 522. The transaction request message includes at least the selected user account, recipient account details (e.g., an acquiring PAN as mentioned above), and the transaction amount. The transaction request message is sent to payment network 220 via a call to payments API 210, at step 524, to cause funds to be transferred from the selected user account to the recipient account. On success, a transaction ID is returned to the payment application at step 526.

In another type of push payment, indicated in dotted outline at box B of FIG. 5, the payment application creates a transaction request message at step 528. The transaction request message includes at least the selected user account, recipient account details, and the transaction amount. The transaction request message is forwarded to PSP 210, which initiates a transfer of funds from the selected user account to the recipient account via payment network 220, at step 530. On success, a transaction ID is returned to the payment application at step 532.

At step 534, the issuer 140 submits the terminal ID, nonce, and transaction ID to the validation server 120.

At step 536, the validation server 120 requests verification of the transaction. For example, when the validation server 120 receives the transaction ID as part of the transaction data from the payment application, it may verify that the transaction ID is valid, for example by checking its format, a checksum digit, etc. The validation server 120 may also check that the transaction appears in a list of all transactions made with the acquiring PAN as a destination account, and/or that an authorisation request corresponding to the received transaction ID exists.

In one example, all transactions made over payment network 220 and corresponding to the acquiring PANs retrieved at step 512 may be logged by validation server 120, for example by receiving batch updates from payment network 220 (e.g., during each clearing cycle). The validation server 120 may then, during a specific transaction at step 536, search through the logged transactions to verify the specific transaction.

In another example, the validation server 120 may submit the acquiring PAN and/or the transaction ID to the payment network 220 to request verification of the transaction. The payment network 220 may receive the transaction ID and other transaction-related data, and verify that the transaction-related data submitted by the validation server 120 matches those for the corresponding acquiring PAN and/or transaction ID in its records.

If the transaction is verified, the validation server 120 generates a transaction certificate, and transmits the TC to the payment application executing on mobile device 104, at step 538.

At step 540, the user 102 taps the mobile device 104 at the self-service machine 110 for a second time, to initiate a second data exchange that causes transmission of the TC to the self-service machine 110 as before. The smart card emulator 320 and/or the request processor 332 validate the TC, and if valid, cause the control unit 210 to start the selected service.

As explained above in reference to the method 400 of FIG. 4, one or both of the first and second data exchanges may occur via channels other than NFC.

Figure 6:
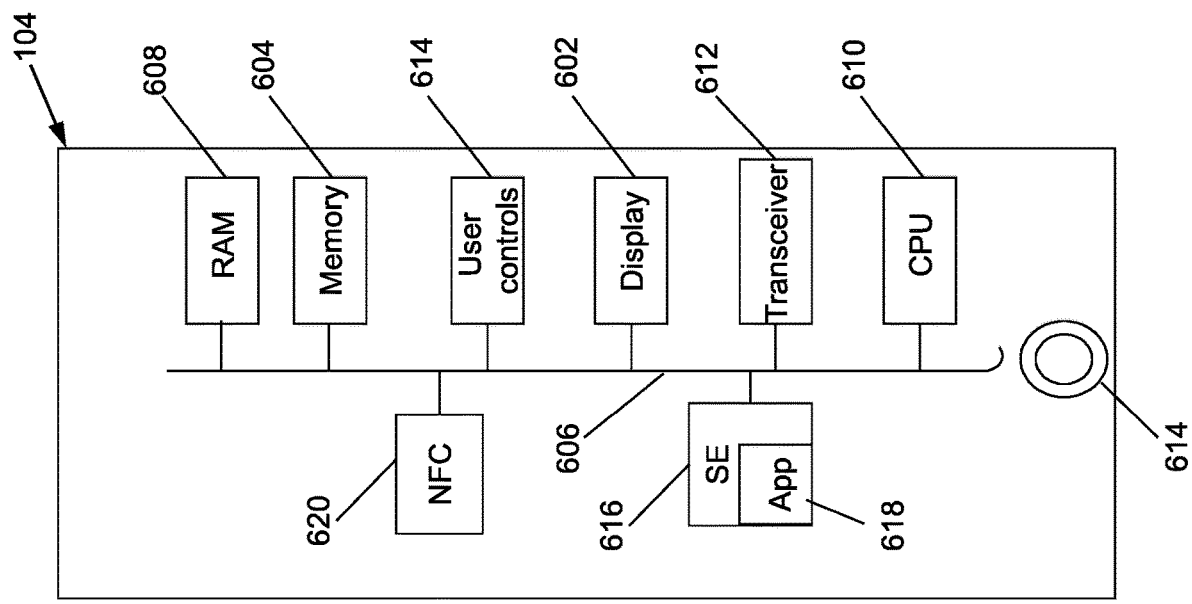
FIG. 6 is an example system architecture of a mobile device of the system of FIG. 1.

FIG. 6 is a block diagram showing an example of a mobile computer device 104. The mobile computer device 104 may be a smart phone, a tablet, a personal data assistant (PDA), a palm-top computer, or multimedia Internet enabled cellular telephone. For ease of description, the mobile computer device 104 is described below, by way of non-limiting example, with reference to a mobile device in the form of a smart phone.

As shown, the mobile computer device 104 includes the following components in electronic communication via a bus 606:
(a) a display 602;
(b) non-volatile (non-transitory) memory 604;
(c) random access memory ("RAM") 608;
(d) N processing components 610;
(e) a transceiver component 612 that includes N transceivers;
(f) user controls 614;
(g) a secure element (SE) 616; and
(h) a NFC controller 620.

Although the components depicted in FIG. 6 represent physical components, FIG. 6 is not intended to be a hardware diagram. Thus, many of the components depicted in FIG. 6 may be realised by common constructs or distributed among additional physical components. Moreover, it is certainly contemplated that other existing and yet-to-be developed physical components and architectures may be utilised to implement the functional components described with reference to FIG. 6.

The display 602 generally operates to provide a presentation of content to a user, and may be realised by any of a variety of displays (e.g., CRT, LCD, HDMI, micro-projector and OLED displays).

In general, the non-volatile data storage 604 (also referred to as non-volatile memory) functions to store (e.g., persistently store) data and executable code.

In some embodiments for example, the non-volatile memory 604 includes bootloader code, modem software, operating system code, file system code, and code to facilitate the implementation components, known to those of ordinary skill in the art, which are not depicted nor described for simplicity.

In many implementations, the non-volatile memory 604 is realised by flash memory (e.g., NAND or ONENAND memory), but it is certainly contemplated that other memory types may be utilised as well. Although it may be possible to execute the code from the non-volatile memory 604, the executable code in the non-volatile memory 604 is typically loaded into RAM 608 and executed by one or more of the N processing components 610.

The N processing components 610 in connection with RAM 608 generally operate to execute the instructions stored in non-volatile memory 604. As one of ordinarily skill in the art will appreciate, the N processing components 610 may include a video processor, modem processor, DSP, graphics processing unit (GPU), and other processing components.

The transceiver component 612 includes N transceiver chains, which may be used for communicating with external devices via wireless networks. Each of the N transceiver chains may represent a transceiver associated with a particular communication scheme. For example, each transceiver may correspond to protocols that are specific to local area networks, cellular networks (e.g., a CDMA network, a GPRS network, a UMTS networks), and other types of communication networks.

The mobile computer device 104 can execute mobile applications, such as a digital wallet application, or another application capable of payment functionality, such as a mobile banking application provided by an issuer 140. The payment application 618 could be a mobile application, web page application, or computer application. The payment application 618 may be accessed by a computing device such as mobile computer device 104, or a wearable device such as a smartwatch. The payment application 618 can be used with payment cards including credit cards, debit cards, store cards, etc.

The NFC controller 620, in conjunction with the secure element 416 and/or with other hardware components (e.g. one or more of the N processors 610) may be adapted to effect contactless payments. To this end, the SE 616 may emulate the functionality of a standard physical payment or non-payment smart card as described above. Sensitive (e.g. payment-related) information is stored in encrypted form on the SE 616, and it is only addressable by authorised software or hardware components, such as payment application 618, in order to effect EMV transactions. The digital wallet application 618 may itself be stored in the SE 616. Alternatively, in an embodiment which is not illustrated, one or more processors 610 of mobile device 104 may include a trusted execution environment (TEE) in which the payment application 618 executes and/or in which sensitive data such as payment-related data is stored. Some payment applications 618 may alternatively make use of host card emulation (HCE), in which payment functionality is enabled by standard hardware components of the mobile device 104, but sensitive payment credentials such as the PAN are stored in a remote secure server, i.e. the secure element effectively resides in the cloud. In some cases, HCE can co-exist with TEE or even with SE implementations of digital wallets.

It should be recognised that FIG. 6 is merely exemplary and in one or more exemplary embodiments, the functions described herein may be implemented in hardware, software, firmware, or any combination thereof. If implemented in software, the functions may be transmitted or stored as one or more instructions or code encoded on a non-transitory computer-readable medium 604. Non-transitory computer-readable medium 604 includes both computer storage medium and communication medium including any medium that facilitates transfer of a computer program from one place to another. A storage medium may be any available medium that can be accessed by a computer.

Figure 7:
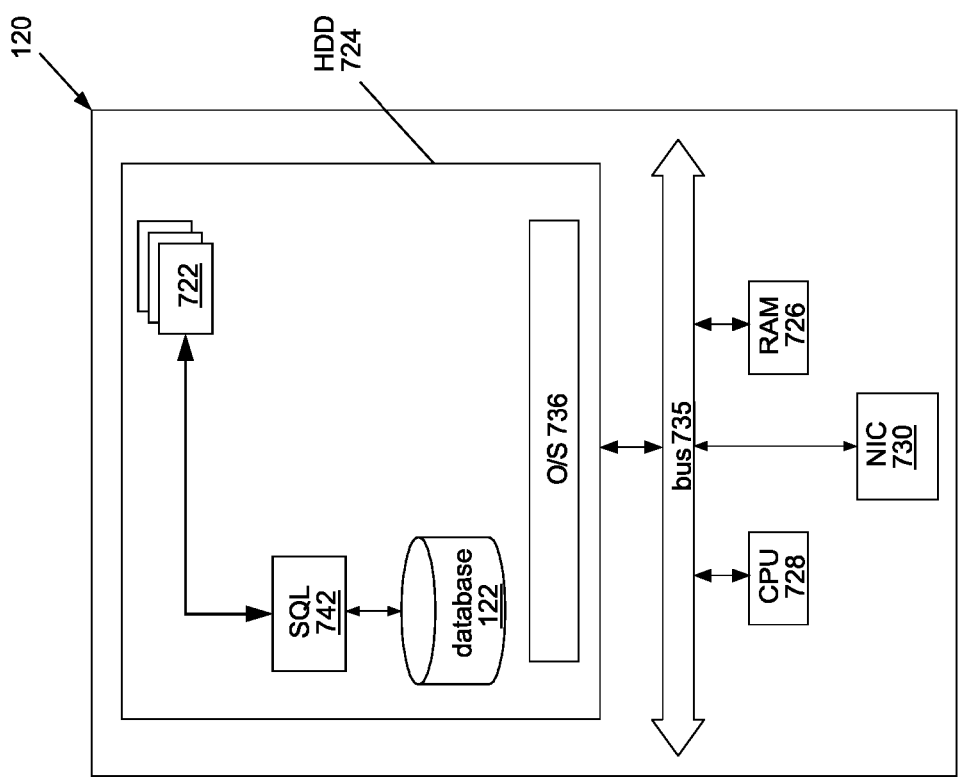
FIG. 7 is an example system architecture of a validation server of the system of FIG. 1.

FIG. 7 shows an example computing device 120 that is capable of implementing a validation server of the system 100. In some embodiments, multiple computing devices 120 may be considered to be a single validation server.

The components of the computing device 120 can be configured in a variety of ways. The components can be implemented entirely by software to be executed on standard computer server hardware, which may comprise one hardware unit or different computer hardware units distributed over various locations, which may communicate over a network. Some of the components or parts thereof may also be implemented by application specific integrated circuits (ASICs) or field programmable gate arrays.

In the example shown in FIG. 7, the computing device 120 is a commercially available server computer system based on a 32 bit or a 64 bit Intel architecture, and the processes and/or methods executed or performed by the computing device 120 are implemented in the form of programming instructions of one or more software components or modules 722 stored on non-volatile (e.g., hard disk) computer-readable storage 724 associated with the computing device 120. At least parts of the software modules 722 could alternatively be implemented as one or more dedicated hardware components, such as application-specific integrated circuits (ASICs) and/or field programmable gate arrays (FPGAs).

The computing device 120 includes at least one or more of the following standard, commercially available, computer components, all interconnected by a bus 735: random access memory (RAM) 726; at least one computer processor 728; and a network interface connector (NIC) 730 which connects the computer device 120 to a data communications network and/or to external devices.

The computing device 120 includes a plurality of standard software modules, including:
(a) an operating system (OS) 736 (e.g., Linux or Microsoft Windows); and
(b) structured query language (SQL) modules 742 (e.g., MySQL, available from http://www.mysql.com), which allow data to be stored in and retrieved/accessed from an SQL database 122.

Advantageously, the database 122 forms part of the computer readable data storage 724. Alternatively, the database 122 is located remote from the server 120 shown in FIG. 7.

The boundaries between the modules and components in the software modules 722 are exemplary, and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, the operations may be combined or the functionality of the operations may be distributed in additional operations in accordance with the invention. Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Certain operations of the flow diagrams of the processes 400, 500 may be executed by a module (of software modules 722) or a portion of a module. The processes may be embodied in a non-transient machine-readable and/or computer-readable medium for configuring a computer system to execute the method. The software modules may be stored within and/or transmitted to a computer system memory to configure the computer system to perform the functions of the module.

The computing device 120 normally processes information according to a program (a list of internally stored instructions such as a particular application program and/or an operating system) and produces resultant output information via input/output (I/O) devices 730. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

It will be appreciated that many further modifications and permutations of various aspects of the described embodiments are possible. Accordingly, the described aspects are intended to embrace all such alterations, modifications, and variations that fall within the spirit and scope of the appended claims.

Throughout this specification and the claims which follow, unless the context requires otherwise, the word "comprise", and variations such as "comprises" and "comprising", will be understood to imply the inclusion of a stated integer or step or group of integers or steps but not the exclusion of any other integer or step or group of integers or steps.

The reference in this specification to any prior publication (or information derived from it), or to any matter which is known, is not, and should not be taken as an acknowledgment or admission or any form of suggestion that that prior publication (or information derived from it) or known matter forms part of the common general knowledge in the field of endeavour to which this specification relates.

The invention claimed is:
1. A method for providing a service at a self-service machine that does not have internet connectivity or that is in an off-line state to be disconnected from the internet, the method including:
receiving, at the self-service machine, a selection of a service;
generating, with the self-service machine, a service request identifier for the selected service;
adding, with the self-service machine, the service request identifier to a list of service requests to be fulfilled;
displaying, with the self-service machine, an optical code to communicate with a mobile device, wherein the optical code encodes service request data including the service request identifier and information to generate an EMV authorisation request cryptogram (ARQC) by the mobile device, a terminal identifier of the self-service machine, and an address of a validation server;
receiving, from the validation server via the mobile device, by a direct communication method, receipt data that is generated based on the ARQC, wherein the receipt data indicates confirmation of completion of an electronic payment transaction initiated by the mobile device and associated with the service identifier;
determine if a transaction certificate (TC) of the receipt data is valid; and responsive to the TC being validated, starting the selected service at the self-service machine, and removing the service request identifier from the list.

2. A method according to claim 1, further comprising:
forwarding, with the validation server, a payment transaction request from the mobile device to an acquirer system for approval; and
receiving, from the acquirer system, the receipt data.

3. A method according to claim 1, further comprising:
forwarding, with the validation server, a transaction identifier of the electronic payment transaction to a payment network for verification; and
receiving, from the payment network, the receipt data.

4. A method according to claim 1, wherein the first direct communication method is near-field communication (NFC).

5. A method according to claim 2, wherein the service request data is generated by a smart card emulator of the self-service machine.

6. A method according to claim 5 wherein the smart card emulator includes an EMV kernel.

7. A method according to claim 6, wherein the smart card emulator is configured to validate the TC.

8. A self-service machine that does not have internet connectivity or that is in an off-line state to be disconnected from the internet, the self-service machine including:
at least one processor; and
a computer-readable storage in communication with the at least one processor and having instructions stored thereon for causing the self-service machine to:
receive a selection of a service;
generate a service request identifier for the selected service;
add the service request identifier to a list of service requests to be fulfilled;
display, with the self-service machine, an optical code to a mobile device, wherein the optical code encodes service request data including the service request identifier and information to generate an EMV authorisation request cryptogram (ARQC) by the mobile device, a terminal identifier of the self-service machine, and an address of a validation server;
receive, from the validation server via the mobile device, by a direct communication method, receipt data that is generated based on the ARQC, wherein the receipt data indicates confirmation of completion of an electronic payment transaction initiated by the mobile device and associated with the service identifier;
determine if a transaction certificate (TC) of the receipt data is valid; and
responsive to the TC being validated, start the selected service, and removing the service request identifier from the list.

9. A self-service machine according to claim 8, wherein the direct communication method is near-field communication (NFC).

10. A self-service machine according to claim 8, including a smart card emulator that is configured to generate the service request data.

11. A self-service machine according to claim 10, wherein the smart card emulator includes an EMV kernel.

12. A self-service machine according to claim 11, wherein the smart card emulator is configured to validate the TC.

13. A system for providing a service at a self-service machine that does not have internet connectivity or that is in an off-line state to be disconnected from the internet, the self-service machine having a device identifier; the system including:
a validation server that stores the device identifier, the validation server being in communication with a mobile device of a user, but not with the self-service machine;
wherein the self-service machine is configured to:
receive a selection of a service;
generate a service request identifier for the selected service;
add the service request identifier to a list of service requests to be fulfilled;
displaying, with the self-service machine, an optical code to the mobile device, wherein the optical code encodes service request data including the service request identifier and information to generate an EMV authorisation request cryptogram (ARQC) by the mobile device, a terminal identifier of the self-service machine, and an address of a validation server;
wherein the validation server is configured to:
receive, from the mobile device, the service request data;
receive, from an issuer system, a payment network, or an acquirer system, receipt data that is generated based on the ARQC, wherein the receipt data indicates of completion of a payment transaction request for the service request by the mobile device; and
transmit, to the mobile device, the receipt data;
wherein the self-service machine is further configured to:
receive, from the mobile device, by a direct communication method, the receipt data; and
determine if a transaction certificate (TC) of the receipt data is valid; and
responsive to the TC being validated,
start the selected service, and
remove the service request identifier from the list.

14. A system according to claim 13, wherein the validation server is configured to forward the payment transaction request from the mobile device to the acquirer system for approval.

15. A system according to claim 13, wherein the validation server is configured to:
forward a transaction identifier of the payment transaction request to the payment network for verification; and
receive, from the payment network, the receipt data.

16. A system according to claim 13, wherein the direct communication method is near-field communication (NFC).

17. A system according to claim 13, wherein the self-service machine includes a smart card emulator that is configured to generate the service request data.

18. A system according to claim 17, wherein the smart card emulator includes an EMV kernel.

19. A system according to claim 18, wherein the smart card emulator is configured to validate the TC.

* * * * *